Nov. 1, 1966 P. W. T. BROADHURST 3,282,703
METHOD FOR BREWING AND DISPENSING BEVERAGES
Filed May 21, 1963 3 Sheets-Sheet 1

Inventor
Peter W. T. Broadhurst
By Stevens, Davis, Miller & Mosher
Attorneys

Nov. 1, 1966   P. W. T. BROADHURST   3,282,703
METHOD FOR BREWING AND DISPENSING BEVERAGES

Filed May 21, 1963   3 Sheets-Sheet 2

Inventor
Peter W. T. Broadhurst
By Stevens, Davis, Miller & Mosher
Attorneys

Nov. 1, 1966   P. W. T. BROADHURST   3,282,703
METHOD FOR BREWING AND DISPENSING BEVERAGES
Filed May 21, 1963   3 Sheets-Sheet 3

Inventor
Peter W. T. Broadhurst
By Stevens, Davis, Miller & Mosher
Attorneys

United States Patent Office 3,282,703
Patented Nov. 1, 1966

3,282,703
METHOD FOR BREWING AND DISPENSING BEVERAGES
Peter W. T. Broadhurst, 114 Wolfdale Drive, Box 23, Oakville, Ontario, Canada
Filed May 21, 1963, Ser. No. 282,086
Claims priority, application Canada, Mar. 14, 1963, 870,852
2 Claims. (Cl. 99—71)

This invention relates to beverage vending machines. It relates particularly to an improved method for fresh brewing hot beverages from the dry substantially insoluble beverage base.

More particularly it relates to an improved method and apparatus for the intermittent preparation of a single cup of freshly brewed coffee or tea in an automatic dispensing machine.

The present application discloses in detail a method and apparatus especially well adapted to the brewing of fresh tea or more particularly coffee, however, the invention is not limited to these applications but is limited in scope only by the claims appended hereto.

Conventional methods of brewing coffee employ hot water at a temperature of at least 190° F. in contact with coffee grounds for a period of from 2 to 4 minutes under gravity flow conditions to extract the small proportion of desirable soluble ingredients in the coffee grounds.

In designing a fully automatic coffee vending machine for commercial use the following requirements must be attained to a greater or lesser degree.

(a) The complete vend cycle should be less than 15 seconds.

(b) The machine should employ a standard grind of coffee thus obviating the necessity for specialized purchasing and packaging procedures.

(c) It should be simple to operate.

(d) It must maintain itself without servicing over an extended period of time and be easy to service when necessary. For example the number of moving parts must be held to the minimum.

(e) It must be self-flushing and discharge its waste in an easily handled form.

(f) It must produce an acceptable cup of coffee.

The present invention therefore provides an improved method of brewing intermittently a single unit serving of a freshly brewed beverage such as tea or coffee. The improved method embraces a novel brewing cycle including the following steps:

(a) Supplying a unit serving of dry comminuted beverage base such as tea leaves or finely ground coffee and slightly more than a unit serving of hot water heated to approximately 195° F. to a heated brewing chamber forming a rotating centrifugal separator. In most cases the unit serving of beverage will be one cup and the amount of beverage base such as coffee grounds will be of the order of one-third of an ounce. The amount of water necessary to complete the operation will be approximately 7 ounces.

(b) Collecting and delivering to the ultimate dispensing unit such as a drinking cup the brewed coffee or other beverage which overflows upwardly from the rotating separator.

(c) Upon completion of the brewing and separating cycle terminating abruptly the rotation of the separator to permit the slurry of spent beverage base such as coffee grounds to empty downwardly out of the separator. The abrupt termination of the rotation of the separator imparts considerable circular momentum to the slurry and this momentum results in an effective scouring or flushing action of the slurry in clearing away solid particles of beverage base as the slurry leaves the separator.

The present invention further provides a preferred embodiment of the above method especially suitable for the preparation of one-cup quantities of freshly brewed coffee comprising the following steps:

(a) Supplying one-third ounce of finely ground coffee and three ounces of water at 195° F. to a stationary centrifugal separator.

(b) Permitting said mixture to brew for approximately six seconds.

(c) Rotating the centrifugal separator for a period of five seconds during which time the remaining four additional ounces of hot water are added resulting in the cup of brewed coffee overflowing upwardly out of the rotating separator.

(d) At the end of the five second period terminating abruptly the rotation of the separator containing a slurry of spent coffee grounds in the excess hot water. This results in a downward gravitational flow of the slurry towards a waste receptacle. The abrupt termination of the rotation imparts a circular momentum to the slurry and this momentum results in an effective scouring of the separator by the slurry during emptying.

The present invention further provides an apparatus adapted to the present method of fresh brewing, said apparatus including a rotatable centrifugal separator comprising a first inverted truncated conical member closed at the bottom and a second inverted truncated conical member of larger diameter than the first and fixed coaxially in overflow-receiving relationship thereto. The second cone includes a top closure member perforated inwardly of said cone to permit upward overflow of brewed beverage for delivery to a unit serving receptacle such as a drinking cup during rotation of said separator while retaining denser brewed beverage base slurries such as coffee grounds within the second cone outwardly of said perforations. The perforations in the closure member may preferably be provided with screen to improve retention of the insoluble beverage base such as coffee grounds during rotation of the separator.

The second cone is open at the bottom to form a downward orifice for gravitational release of the spent coffee grounds slurry when the separator is at rest. Associated with the means for rotating the separator is a means for terminating abruptly the rotation of the separator.

Extensive experimentation has established the fact that where rapid convenient extraction of the soluble oils and solids from coffee grounds three major factors must be considered as follows:

A brewing temperature of approximately 195° F. is desirable. If a higher temperature is maintained problems emanating from the presence of steam become important. Below this desired temperature the rate of extraction is reduced and the brewing time is thereby extended seriously.

It has been found that the percentage of soluble solids extracted from coffee grounds (established by the use of a hydrometer) is a function of contact time or brewing time. However, total extraction is not desirable from a flavour evaluation point of view. It has been found that given intimate contact of hot water and finely ground coffee in ten seconds their more volatile and desirable constituents are removed and further brewing time extracts more of the bitter constituents which detract from the flavour of the final product.

The rate of extraction is found to be a function of the grind size and is inversely proportional to the average of particle size. Thus the finer the particles the faster the rate of extraction. However, the finer the grind the more sludge will be present in the solution and the removal of the sludge becomes a major part of the brewing problem. The obvious way to shorten the brewing time in automatic equipment is to use a very fine grind of coffee. Prior art devices use positive pressures to aid in filtration since the fine grind forms a difficultly filtrable sludge.

Certain units currently in use, use a conventional filter paper in order to remove the extremely small particle size sludges. Because of the very short time available, extremely high pressures (up to 400 pounds per square inch) are used. It was to avoid the complicated sealing problems inherent in the use of such high pressures that the use of a centrifuge as a means of separating the sludges was investigated. Initial experiments with mesh walled cups, and basket type centrifuges showed that this was a practical solution to the problem. The major problem in using a centrifuge of this type is in eliminating the products of the filter process so that the device can be used for extended periods without attention.

The present process and apparatus employ a rotary centrifuge incorporating a provision to trap a portion of the liquid in the device so that when it is stopped abruptly at the end of a vend cycle the liquid acts to flush out the centrifuge thus preparing it for the next cycle. It is found necessary to trap about one-half ounce of liquid to flush the one-third ounce of grounds used for a seven ounce cup of coffee. In order to accentuate the scouring or flushing action a brake has been fitted to the centrifugal separator which acts to stop the rotation of the separator abruptly at the end of the brewing time. The coffee grounds slurry retains considerable momentum and the circulating slurry scours the chamber clean as it falls downwardly to the waste disposal.

The presently developed method and apparatus is particularly adapted for use in a cup-at-a-time coffee vending machine. Machines embodying this invention have been found to extract sufficient soluble oils and solids from the coffee grounds to produce a commercially acceptable cup of coffee. Furthermore, the flushing action is so effective that it has operated through as many as 1500 brew cycles or more without cleaning or attention of any kind.

In the drawings which form a part of this specification:

Figure 1:
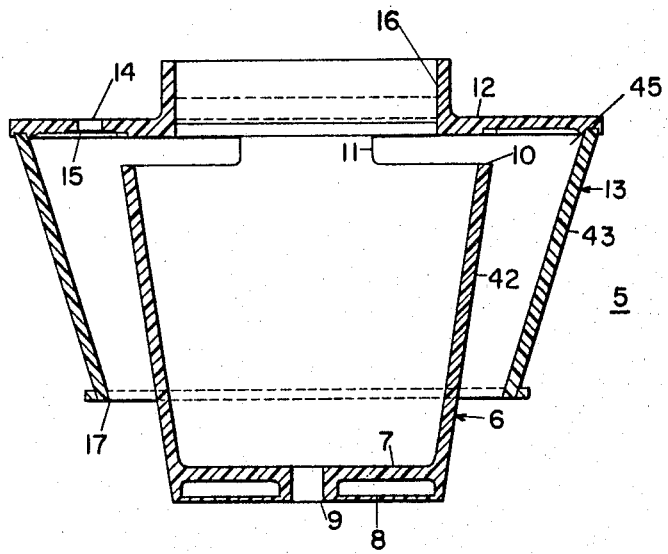
FIG. 1 illustrates a preferred embodiment of a centrifugal separator according to the present invention.

Referring now to FIG. 1, the centrifugal separator shown generally as 5, preferably is made of polystyrene and is assembled by gluing. It includes a first truncated conical chamber 6 including a bottom closure section 7 with reinforcing ribs 8. Bottom 7 of chamber 6 is provided with aperture 9 to receive a power shaft from a suitable motor. Upper overflow edge 10 is substantially circular in shape and is interrupted only by support tabs 11 by which conical chamber 6 is fixed to a closure member 12 mounted on second truncated conical member 13. Closure member 12 includes apertures 14 which may be provided with wire screens 15. Closure member 12 has a large central aperture 16. The bottom of conical member 13 forms a circular waste slurry disposal edge 17.

Figure 2:
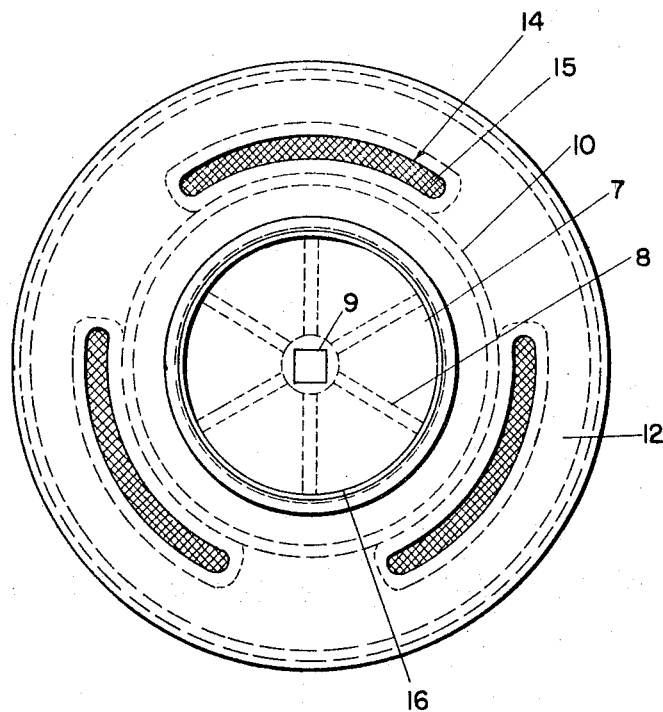
FIG. 2 shows a top view of the separator shown in FIG. 1.

Referring now to FIG. 2, the square shape of aperture 9 and the circular shape of the remaining parts of the unit are clearly shown. The wire screens 15 are preferably made of stainless steel wire cloth No. 250.

Figure 3:
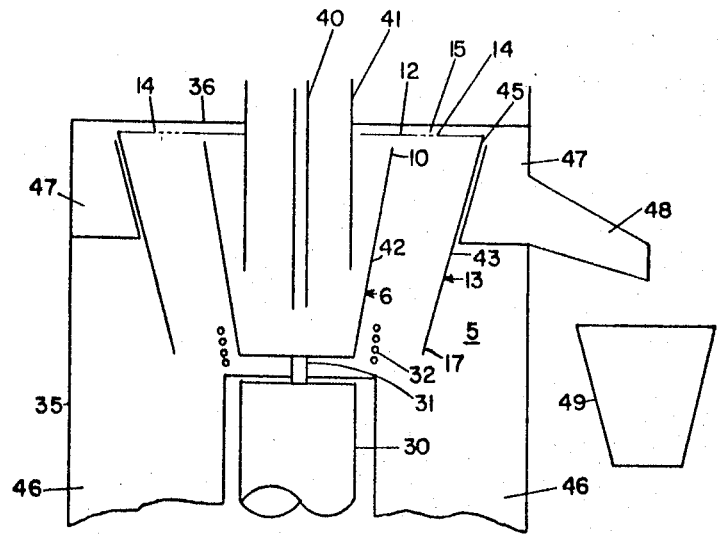
FIG. 3 shows a semi-schematic diagram illustrating the co-operation between the parts of the separator shown in FIG. 1 installed in a vending machine.

In FIG. 3 which is a semi-schematic diagram, rotatable centrifugal separator 5 includes conical members 6 and 13, closure member 12, closure member apertures 14 and aperture screens 15. Also seen are brewing chamber overflow edge 10 and waste disposal edge 17. An electric motor 30 acting through axle 31 drives the entire rotatable centrifugal separator 5. Circular heating element 32 encircles the brewing chamber to keep it at an elevated temperature to avoid undue cooling of the hot water during brewing. Support means 35, 36 retain all parts in working relationship to each other.

Hot water at about 195° F. is supplied through pipe 40 and finely ground coffee is supplied through large diameter pipe 41 into conical chamber 6. When the centrifugal separator 5 is rotating rapidly the brewing mixture climbs up the side walls 42 of chamber 6 until it reaches overflow edge 10 at which point it overflows into the second conical member 13 which being fixed to conical member 6 is rotating therewith. The mixture of brewed coffee and coffee grounds is retained in the circular trough 45 formed between closure member 12 and the walls 43 of second conical member 13 outwardly of aperture 14. It will be noted that during rotation of the centrifugal separator no liquid will reach the waste disposal edge 17 since it terminates inwardly of the outer edge of apertures 14 and therefore any overflow while the centrifugal separator is rotating will take place in an upward direction. As the overflow from overflow edge 10 of chamber 6 continues the above mentioned trough 45 in second conical member 13 will fill with liquid in which the solid components are gravitating towards the point at the junction of closure member 12 and conical wall 43 since this is the point most remote from the axis of rotation of the centrifugal separator. Thus the overflow which eventually takes place through aperture 14 consists of more or less clear brewed coffee and the major portion of the coffee grounds are retained in the trough 45. At the end of the brewing cycle no more coffee is overflowing at overflow edge 10 and therefore overflow through aperture 14 will cease. At this point a timing device will abruptly terminate the rotation of the centrifugal separator causing the trough 45 to cease rotating abruptly. The material remaining in this trough is a mixture containing almost all the solid undissolved portion of the coffee grounds together with about a half ounce of water. This slurry will continue to rotate because of its own momentum. As its rotation begins to slow down it will fall out of the centrifugal separator past waste disposal edge 17 down to a waste disposal area 46. As it falls the rotational momentum acts to scour trough 45 and walls 43 to ensure that little or no coffee grounds remain behind after the brewing cycle is complete. Meanwhile the brewed coffee which overflowed through apertures 14 has collected in annular collecting chamber 47 and runs down through delivery trough 48 into a drinking cup 49. Additions of cream and sugar can be made by conventional methods.

Coffee produced by this process has been found to have the desired soluble solid content. The removal of sludges and other solid materials has been found to be superior to that attainable with conventional filters. The complete vend cycle can be operated in between 10 and 15 seconds.

A most preferred embodiment of the present process and one which is particularly well suited to the preparation of freshly brewed coffee is as follows. Finely ground coffee and water heated to 195–200° F. are loaded into the chamber 6. There it is allowed to stand for a period of 4 to 6 seconds during which time this greater part of the brewing takes place. The centrifugal separator 5 including the chamber 6 is then rotated at a speed of 1500 r.p.m. causing the mixture to move up the walls 42 of chamber 6 and into the outer cone 13. In this cone 13 centrifugal forces cause the mixture to separate the grounds being forced again to the bottom of trough 45 formed by the wall 13 and the closure member 12 of the cone 13. The brewed coffee escapes through the apertures 14 and is collected in the annular collection chamber 47 and delivered to the drinking cup 49 through spout 48.

Rotation continues for about 5 seconds until all the available brewed coffee has passed through apertures 14 leaving behind only the slurry of coffee grounds and excess water in the trough 45. At the end of the five second period the motor is abruptly stopped by a brake.

This causes the centrifugal separator 5 to stop suddenly and the rotational momentum of the slurry forces it to continue rotating in the trough 45 giving a vigorous scouring action before it falls past waste disposal edge 17 into the waste disposal area 46.

A further most preferred embodiment involves loading the one-third ounce of coffee into the stationary chamber 6 together with three ounces of water at 195°–200° F. After 6 seconds of brewing the centrifugal separator 5 is energized to rotation and the mixture moves through the device as already described. The remaining four ounces of hot water necessary to produce a full cup is introduced continuously at this time and insures that the device is well flushed. At the end of five seconds of rotation the centrifuge motor is de-energized and stopped rapidly by the brake. This again causes the remaining slurry in the centrifuge to scour out the trough 45 as it falls past the waste disposal edge 17 into waste disposal area 46.

Figure 4:
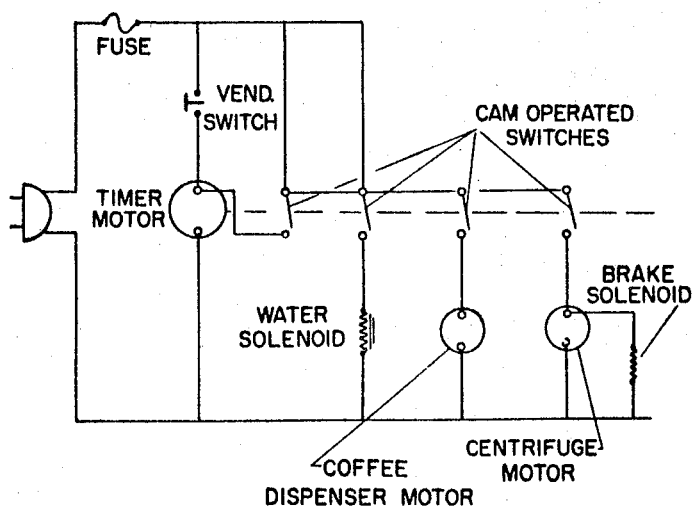
FIG. 4 is a diagram of the wiring required to effect the vend cycle used in this invention.

The brewing cycles employed in the method and apparatus of the present invention are controlled by a timer motor and four cam operated switches. One switch is designated the motor lock switch and ensures that the timer motor runs for one complete revolution only. The next switch controls the time that the coffee ingredient supply motor operates and hence the amount of coffee supplied. The third cam controls the supply of water. The profile of this cam is such that the brewing chamber receives an initial supply of water, a rest period, and then a final supply during the centrifuging phase. The fourth switch controls the centrifuge motor and its associated brake. This motor runs for the last five seconds of the cycle. FIG. 4 demonstrates a simple circuit of this type. In a vending machine the operation is initiated by a coin operated switch which operates a vend relay which supplies power to the brew mechanism. Cream and sugar are supplied by conventional procedures.

I claim:

1. A method of brewing intermittently a single unit serving of fresh coffee beverage comprising, brewing in a mixing chamber a unit serving of dry, finely ground coffee beans and slightly more than a unit serving of heated water to form a brew mixture, forcing said brew mixture into a separator chamber upwardly and outwardly by rotating said mixing chamber, leaving said mixing chamber substantially clear for the next cycle of operation, in said separator chamber forcing said brew mixture upwardly and outwardly and forcing the grounds to the outside of brewed coffee beverage by rotating said brew mixture, removing a unit of brewed beverage by forcing the same upwardly and outwardly through a screen at the top of the separator chamber while limiting the upward movement of the grounds and delivering said unit of brewed beverage to a dispensing unit, leaving in the separator chamber excess brewed beverage and grounds in the form of waste, terminating abruptly, after the unit of brewed beverage has been removed, the rotation of the separator chamber such that the waste continues to rotate, decreasing the radius of rotation as said rotating waste is lowering due to gravity so that the circular momentum of the waste is maintained, enabling the waste to scour the side of the separator chamber, and removing the waste through the bottom of the separator chamber after the waste has lowered due to gravity.

2. A method as set forth in claim 1, further comprising maintaining the mixing chamber and separator chamber at a temperature substantially the same as the predetermined temperature of said heated liquid.

References Cited by the Examiner

UNITED STATES PATENTS

| | | | |
|---|---|---|---|
| 228,889 | 6/1880 | Gue et al. | 99—71 |
| 270,787 | 6/1883 | Groff | 99—71 |
| 2,149,270 | 3/1939 | Burgess | 99—289 XR |
| 2,437,601 | 3/1948 | Hamlet | 99—290 |
| 2,589,222 | 3/1952 | Burgess | 99—290 |
| 2,589,336 | 3/1952 | Burgess | 99—289 |

A. LOUIS MONACELL, *Primary Examiner.*

M. W. GREENSTEIN, *Assistant Examiner.*